United States Patent
Na

(10) Patent No.: US 12,056,747 B1
(45) Date of Patent: Aug. 6, 2024

(54) METHOD FOR PROVIDING INFORMATION BASED ON E-COMMERCE AND COMPUTING DEVICE FOR EXECUTING THE SAME

(71) Applicant: CONIALAB CO., LTD., Seoul (KR)

(72) Inventor: Hyun Jung Na, Gyeonggi-do (KR)

(73) Assignee: CONIALAB CO., LTD., Seoul (KR)

( * ) Notice: Subject to any disclaimer, the term of this patent is extended or adjusted under 35 U.S.C. 154(b) by 0 days.

(21) Appl. No.: 18/422,281

(22) Filed: Jan. 25, 2024

(30) Foreign Application Priority Data

Jan. 26, 2023 (KR) ........................ 10-2023-0010446

(51) Int. Cl.
*G06Q 30/0601* (2023.01)
*G06Q 30/0201* (2023.01)

(52) U.S. Cl.
CPC ..... *G06Q 30/0601* (2013.01); *G06Q 30/0201* (2013.01); *G06Q 30/0631* (2013.01)

(58) Field of Classification Search
None
See application file for complete search history.

(56) References Cited

U.S. PATENT DOCUMENTS

| 2008/0262960 | A1* | 10/2008 | Malone | G06Q 40/04 705/37 |
| 2010/0306037 | A1* | 12/2010 | Lee | G06Q 30/00 705/30 |
| 2013/0066753 | A1* | 3/2013 | Doyle | G06Q 10/087 705/28 |

FOREIGN PATENT DOCUMENTS

| KR | 10-2020-0009542 A | 1/2020 |
| KR | 10-2020-0104141 A | 9/2020 |
| KR | 10-2172045 B1 | 10/2020 |
| KR | 10-2322668 B1 | 11/2021 |
| KR | 10-2453535 B1 | 10/2022 |

OTHER PUBLICATIONS

Durkin, M., et al., "Protecting Your Product and Brand Through Minimum Advertised Price Policies," Mondaq Business Briefing, Aug. 18, 2017. (Year: 2017).*
Herrold, T., et al., "Class Actions Now Flowing From FTC and DOJ's No-Poach Enforcement," Mondaq Business Briefing, May 17, 2018. (Year: 2018).*
Anon., "EU Fines Pioneer, Other Electronics Makers for Fixing Prices," Jiji Press English News Service [Tokyo] Jul. 25, 2018. (Year: 2018).*

* cited by examiner

*Primary Examiner* — Nicholas D Rosen
(74) *Attorney, Agent, or Firm* — The PL Law Group, PLLC

(57) ABSTRACT

A method for providing information based on e-commerce according to an embodiment of the present disclosure is performed on a computing device including one or more processors and a memory that stores one or more programs executed by the one or more processors, and includes collecting product sales information of each seller registered on a platform, collecting purchase activity information of a purchaser who accesses an online shopping mall of each seller, generating a product sales-related report for each supplier supplying a product to the platform based on the product sales information and the purchase activity information, and providing the product sales-related report to a corresponding supplier terminal.

13 Claims, 6 Drawing Sheets

METHOD FOR PROVIDING INFORMATION BASED ON E-COMMERCE AND COMPUTING DEVICE FOR EXECUTING THE SAME

CROSS-REFERENCE TO RELATED APPLICATION AND CLAIM OF PRIORITY

This application claims the benefit under 35 USC § 119 of Korean Patent Application No. 10-2023-0010446, filed on Jan. 26, 2023, in the Korean Intellectual Property Office, the entire disclosure of which is incorporated herein by reference for all purposes.

BACKGROUND

1. Field

Embodiments of the present disclosure relate to a technology for providing information based on e-commerce.

2. Description of Related Art

With the development of information and communication technology, online commerce, that is, e-commerce, which involves selling a product by building an online market, has developed. The initial form of online commerce was in the form in which a seller opened an online shopping mall (hereinafter referred to as shopping mall) directly, registered the product, and a visitor who accessed the shopping mall purchased the product, but with the advent of intermediary shopping malls that connect a seller and a purchaser emerged and grew into a large shopping malls (e.g., Auction, 11th Street, G Market, etc.) by providing convenient sales and purchasing services, which leads to explosive growth in an e-commerce market. Since then, this explosive growth has continued with the emergence of social commerce using social networks (e.g., Tmon, Wemakeprice) and various forms of e-commerce (e.g., Coupang) that provide innovative offline distribution and logistics services. These large-scale e-commerce platforms (e.g., large intermediary platforms, social commerce, etc.) are bringing large profits to a user, especially the seller.

Recently, a new type of e-commerce market is being actively formed using communication channels with fans of highly influential individuals with great influence on social network services (SNS) (e.g., Facebook, Instagram) and individual media services (e.g., influencer, celebrity, etc.), or through strong personal networks in communities where people with similar personal interests gather.

SUMMARY

Embodiments of the present disclosure are intended to provide a new method of providing information based on e-commerce and a computing device for executing the same.

According to an exemplary embodiment of the present disclosure, there is provided a method for providing information based on e-commerce performed on a computing device including one or more processors and a memory that stores one or more programs executed by the one or more processors, the method including collecting product sales information of each seller registered on a platform, collecting purchase activity information of a purchaser who accesses an online shopping mall of each seller, generating a product sales-related report for each supplier supplying a product to the platform based on the product sales information and the purchase activity information, providing the product sales-related report to a corresponding supplier terminal, generating notification information based on a sales amount list for each seller selling the product of the supplier and lowest price information for each product of the supplier, and providing the notification information to one or more of the supplier and a corresponding seller, in which the generating of the notification information includes extracting a seller with lower sales ranking based on the sales amount list for each seller, and, when the seller with lower sales ranking registers the product of the supplier in an online shopping mall at the lowest price, generating notification information for restricting the number of times of lowest-priced registrations, and the method further includes counting the number of times of lowest-priced registrations of the seller with lower sales ranking and assigning a preset penalty to the corresponding seller when the number of times of lowest-priced registrations exceeds a preset threshold number of times.

The product sales information may include one or more of seller identification information of the seller who sold the product, product identification information of the sold product, supplier information of the product, sales date and time information, sales quantity, and purchaser information, and the purchase activity information may include one or more of purchaser identification information of the purchaser, information on an access time of the purchaser, product search information in the online shopping mall, and information on whether or not the product was purchased in the online shopping mall.

The product sales-related report may include a list of sellers up to a preset rank based on a sales amount for each seller selling the product of the supplier, statistical data of the purchaser who purchased the product of the supplier, repurchase-related information of the purchaser who purchased the product of the supplier, a sales volume ranking list within a category containing the product of the supplier, a similar product search list of the purchaser who purchased the product of the supplier, a list of products purchased together by the purchaser who purchased the product of the supplier, search term path information of the purchaser who purchased the product of the supplier, and one or more of a lowest price and an average price for each product of the supplier.

The method for providing information based on e-commerce may further include providing additional information for improving a profit rate to one or more of the supplier and the seller based on the product sales-related report.

The providing of the additional information may include extracting the seller with lower sales ranking from among sellers selling the product of the supplier and recommending a content creator related to the product to one or more of the seller with lower sales ranking and the supplier.

The recommending of the content creator may include extracting first content creators who have registered product content related to the product of the seller with lower sales ranking from among the content registered on the platform, calculating a first promotional suitability level for the product for each of the extracted first content creators, and finally selecting a first content creator for promotion of the product from among the extracted first content creators according to the calculated first promotional suitability level.

In the calculating of the first promotional suitability level, based on suitability level determination factors including one or more of the number of times or frequency of uploads of content related to the product, a degree of social feedback of content related to the product, a degree of influence of the extracted first content creator, and forecasted sales related to the product of the extracted first content creator, the first promotional suitability level may be calculated for each of the extracted first content creators.

The recommending the content creator may further include extracting second content creators in each field who have collaborated with the finally selected first content creator, calculating a second promotional suitability level for the product for each of the extracted second content creators, and finally selecting a second content creator in each field from among the extracted second content creators according to the calculated second promotional suitability level.

In the calculating of the second promotional suitability level, based on suitability level determination factors including one or more of the number of times of collaborations with the finally selected first content creator, a collaboration satisfaction level of the finally selected first content creator, and the number of times of content creations related to the product, the second promotional suitability level may be calculated for each of the extracted second content creators.

The recommending of the content creator may include providing information on the finally selected first content creator and the finally selected second content creator in each field to one or more of the seller with lower sales ranking and the supplier.

The generating of the product sales-related report may include generating a list of sellers up to a preset rank based on a sales amount for each seller selling the product of the supplier based on the product sales information and the purchase activity information, generating statistical data of the purchaser who purchased the product of the supplier based on the product sales information and the purchase activity information, generating repurchase-related information of the purchaser who purchased the product of the supplier based on the product sales information and the purchase activity information, generating a sales volume ranking list within a category containing the product of the supplier based on the product sales information and the purchase activity information, generating a similar product search list of the purchaser who purchased the product of the supplier based on the product sales information and the purchase activity information, generating a list of products purchased together by the purchaser who purchased the product of the supplier based on the product sales information and the purchase activity information, generating search term path information of the purchaser who purchased the product of the supplier based on the product sales information and the purchase activity information, and checking one or more of a lowest price and an average price for each product of the supplier based on the product sales information and the purchase activity information.

According to another exemplary embodiment of the present disclosure, there is provided a computing device including one or more processors, a memory, and one or more programs, in which the one or more programs are stored in the memory and configured to be executed by the one or more processors, and the one or more programs include an instruction for collecting product sales information of each seller registered on a platform, an instruction for collecting purchase activity information of a purchaser who accesses an online shopping mall of each seller, an instruction for generating a product sales-related report for each supplier supplying a product to the platform based on the product sales information and the purchase activity information, an instruction for providing the product sales-related report to a corresponding supplier terminal, an instruction for generating notification information based on a sales amount list for each seller selling the product of the supplier and lowest price information for each product of the supplier, and an instruction for providing the notification information to one or more of the supplier and a corresponding seller, and the instruction for generating of the notification information includes an instruction for extracting a seller with lower sales ranking based on the sales amount list for each seller, and, when the seller with lower sales ranking registers the product of the supplier in the online shopping mall at the lowest price, an instruction for generating notification information for restricting the number of times of lowest-priced registrations, and the one or more programs further include an instruction for counting the number of times of lowest-priced registrations of the seller with lower sales ranking and assigning a preset penalty to the corresponding seller when the lowest-priced registration number exceeds a preset threshold number of times.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. Additionally, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In the following description, "transfer," "communication," "transmission," "reception," of a signal or information and other terms having similar meaning include not only direct transmission of a signal or information from one component to another component, but also transmission of the signal or information through another component. In particular, "transferring" or "transmitting" a signal or information to a component indicates a final destination of the signal or information and does not mean a direct destination. This is the same for "receiving" a signal or information. In addition, in this specification, the fact that two or more pieces of data or information are "related" means that if one data (or information) is acquired, at least part of the other data (or information) can be obtained based on it.

Additionally, terms such as first, second, etc. may be used to describe various components, but the components should not be limited by the terms. Terms may be used for the purpose of distinguishing one component from another. For example, a first component may be referred to as a second component, and similarly, the second component may also be referred to as a first component without departing from the scope of the present disclosure.

Figure 1:
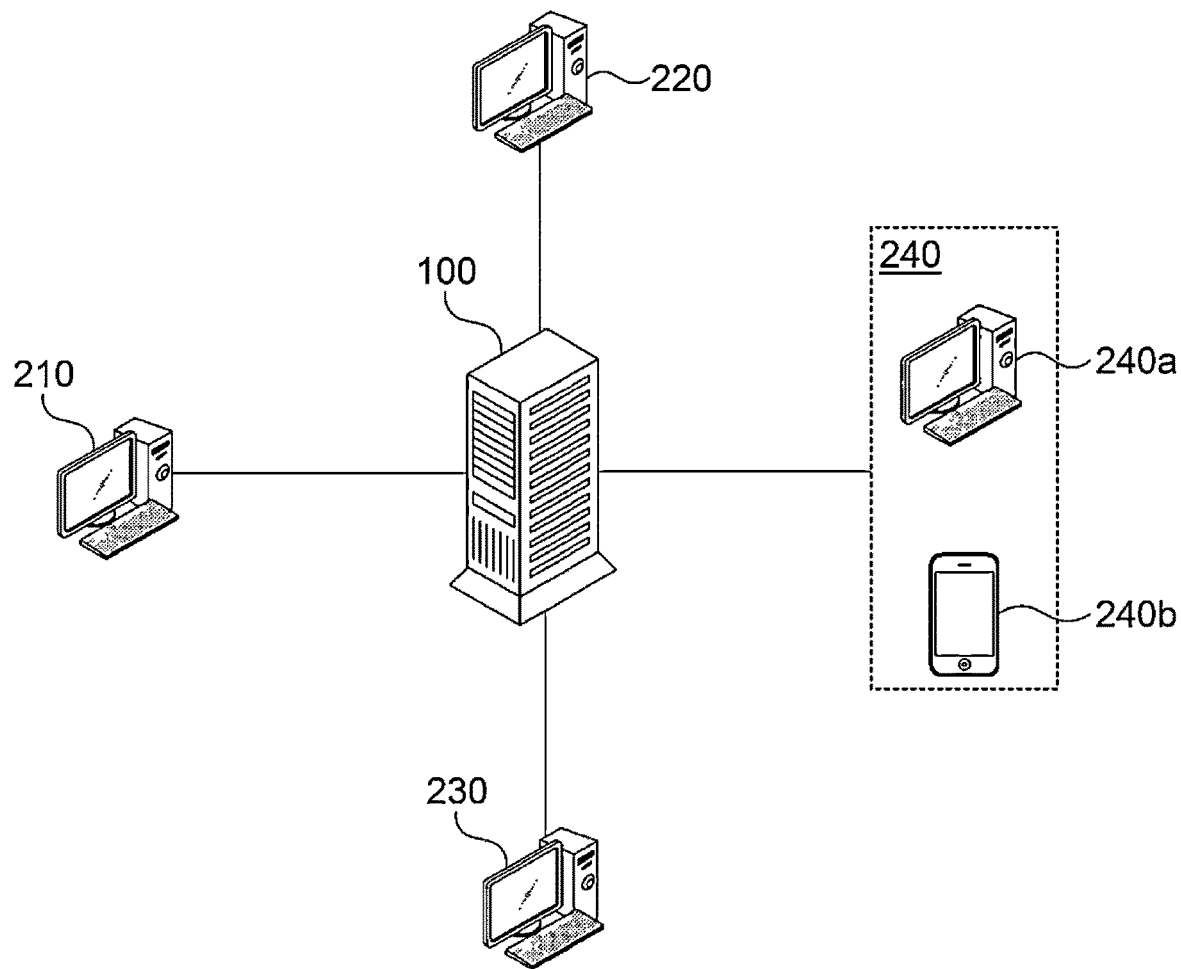
FIG. 1 is a diagram illustrating an e-commerce environment according to an embodiment of the present disclosure.

FIG. 1 is a diagram illustrating an e-commerce environment according to an embodiment of the present disclosure.

Referring to FIG. 1, the e-commerce environment 50 may include a platform server 100, a supplier terminal 210, a seller terminal 220, a content creator terminal 230, and a purchaser terminal 240. The platform server 100 may be connected to each of the supplier terminal 210, the seller terminal 220, the content creator terminal 230, and the purchaser terminal 240 through a communication network.

The platform server 100 may provide e-commerce platform services through user terminals 210, 220, 230, and 240. The e-commerce platform services may include overall services required to sell products online, such as product supply, sales, promotion, and purchase.

According to one embodiment, the platform server 100 may register a supplier of a product to be sold on the platform through the supplier terminal 210. The supplier may be, for example, a person who supplies the product to be sold on the platform and delivers the product sold by a seller. In other words, the supplier may be a person who is only responsible for product distribution and entrusts the rest to other users.

According to one embodiment, the platform server 100 may register the product supplied by the supplier through the supplier terminal 210. The platform server 100 may provide a service for managing product registration through the provider terminal 210. According to one embodiment, the platform server 100 may provide a list of registered products. According to one embodiment, the platform server 100 may update the list of registered products. For example, the platform server 100 may receive application information for registering a new product from the supplier, and add the product to the list if registration is approved. Additionally, the platform server 100 may receive request information for deleting a registered product from the supplier and delete the requested product from the list.

According to one embodiment, the platform server 100 may provide a service for managing product sales through the supplier terminal 210. According to one embodiment, the platform server 100 may provide sales information of the registered product. The sales information may include, for example, information such as sales volume, order amount, and deposit amount. According to one embodiment, the platform server 100 may provide a service for managing product inventory. For example, the inventory management service may be managed together with product registration.

According to one embodiment, the platform server 100 may provide settlement information for a sold product. The settlement information may include, for example, information about sales, settlement, and deposit. According to one embodiment, when receiving a settlement request from the supplier, the platform server 100 may process a process for paying a settlement amount.

According to one embodiment, the platform server 100 may provide a service necessary for product sales to the seller through the seller terminal 220. According to one embodiment, the platform server 100 may register the seller through the seller terminal 220. The seller may be, for example, a person who sells the product registered on the platform by the supplier. According to one embodiment, the platform server 100 may register a product available for sale of the seller through the seller terminal 220.

According to one embodiment, the platform server 100 may provide a comprehensive solution for selling the product through the seller terminal 220. According to one embodiment, the platform server 180 may provide a solution for creating an online shopping mall within the platform. For example, the platform server 180 may provide a function capable of creating an online shopping mall using a drag and drop method through a GUI without hard coding. Additionally, the platform server 180 may provide a premade design template.

According to one embodiment, the platform server 100 may register a product for sale of the seller in the online shopping mall. For example, the product for sale may be a product approved for sale to the seller. According to one embodiment, the platform server 100 may create an online shopping mall requested by the seller. For example, the platform server 100 may create the online shopping mall created by each seller. Each seller can create a separate online shopping mall according to his or her tastes. Accordingly, the purchaser may selectively subscribe to an online shopping mall that suits his or her tastes on the platform service, becomes a member, and purchase a registered product.

According to one embodiment, the platform server 100 may provide a service for managing the online shopping mall through the seller terminal 220. For example, the platform server 100 may provide a solution for setting the name, URL, logo, banner, etc. of the online shopping mall.

According to one embodiment, the platform server 100 may provide a list of products available for sale. According to one embodiment, the platform server 100 may update the list of products available for sale. For example, the platform server 100 may receive an approval application for selling a new product from the seller, and add the new product to the list when the sale is approved. According to one embodiment, the platform server 100 may receive profit rate setting information for the sold product from the seller.

According to one embodiment, the platform server 100 may provide sales information of the product sold in the online shopping mall to the seller terminal 220. The sales information may include, for example, information similar to information provided to the supplier, such as sales volume, order amount, deposit amount, etc., as well as member information of the purchaser. The platform server 100 may provide services for managing orders, delivery, and refunds to the seller terminal 220.

According to one embodiment, the platform server 100 may provide a service necessary for content provision to the supplier through the content creator terminal 230.

According to one embodiment, the platform server 100 may register a content creator. For example, the content creator may create content that helps sell a product and provide the created content to the supplier and the seller. According to one embodiment, the content creator may be an expert who is directly or indirectly required to create content. The professional personnel may include, for example, a model, a hair and makeup expert, a stylist, a photographer, an editor, etc. Additionally, the model may be an influencer, a celebrity, etc. on online social media.

According to one embodiment, the platform server 100 may provide a service that allows content created by the content creator to be shared with platform users. For example, the platform server 100 may provide a content sharing service that uses the platform users as social networks, that is, social network service (SNS). Accordingly, the content creator can upload the created content to a virtual space where he or she can be identified and share the content with the platform users.

According to one embodiment, the content shared through the content sharing service of the platform server 100 may be content for promoting the product sold on the platform. For example, the content may include information (e.g., URL) about the online shopping mall within the platform where the product being promoted is sold. Accordingly, the purchaser can move to a designated shopping mall using the information and purchase the product. According to one embodiment, the platform server 100 may provide information about participants (e.g., the model, the hair and makeup expert, the stylist, the photographer, etc.) who participated in creating the content together with the content. Accordingly, the supplier and the purchaser can easily check not only the model but also all parties concerned necessary for content creation.

According to one embodiment, the platform server 100 may provide the service necessary for product purchase to the supplier through the purchaser terminal 240.

According to one embodiment, the platform server 100 may register the purchaser as a member in the online shopping mall of the seller. For example, the platform server 100 may register the purchaser as a member in the online shopping mall of each seller.

According to one embodiment, the platform server 100 may receive order information of the purchaser who purchased a product through the online shopping mall. The order information may include, for example, the product and delivery information. According to one embodiment, the platform server 100 may provide a payment service to the purchaser who purchases the product. According to one embodiment, the platform server 100 may transmit the order information to the supplier and the seller when payment is completed. Accordingly, the supplier can deliver the ordered product to the purchaser.

According to one embodiment, the platform server 100 may provide a service for managing an order status through the purchaser terminal 240. According to one embodiment, the platform server 100 may provide the order and delivery information for the product purchased from the online shopping mall. According to one embodiment, when receiving order correction information, the platform server 100 may modify the order information based on the received correction information.

According to one embodiment, the platform server 100 may include a database (DB) for data storage, as well as a computing module necessary to provide the e-commerce platform service. In other words, the platform server 100 may include a server configuration generally required to provide the e-commerce service. According to one embodiment, the platform server 100 may provide useful information to a service user by analyzing information stored in the database. The useful information may include, for example, basic data useful for product supply, product sales, content creation, and product purchase and processed data.

According to one embodiment, the user terminals 210, 220, 230, and 240 may be general-purpose devices such as a desktop personal computer (PC), a laptop PC (notebook PC), a smartphone, a tablet PC, a personal digital assistant (PDA), etc. For example, the supplier terminal 210, the seller terminal 220, and the user terminal 230 may be electronic devices with relatively low portability, such as the desktop PC and the laptop PC. The purchaser terminal 240 may be a smartphone 240*b* as well as a desktop PC 240*a* with low portability.

The e-commerce environment 50 described above can provide the e-commerce platform service in which the suppliers who supply products, the sellers who create the online shopping mall to sell the products, and creators who create content to promote the products coexist on one platform, and which sells products to the purchasers, and shares profits from product sales.

Figure 2:
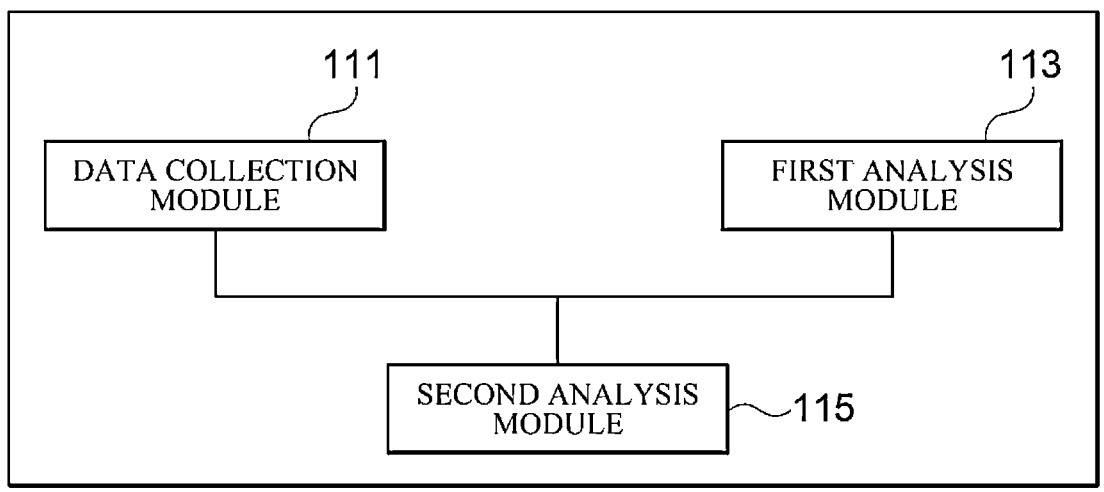
FIG. 2 is a block diagram illustrating a configuration of a platform server according to an embodiment of the present disclosure.

FIG. 2 is a block diagram illustrating a configuration of the platform server 100 according to an embodiment of the present disclosure.

Referring to FIG. 2, the platform server 100 may include a data collection module 111, a first analysis module 113, and a second analysis module 115.

The data collection module 111 may collect product sales information of each seller registered on the e-commerce platform. The data collection module 111 may collect the product sales information whenever the product is sold in the online shopping mall of each seller. Here, the product sales information may include seller identification information of the seller who sold the product, product identification information of the sold product, supplier information of the sold product, sale date information (date and time, etc.), sales quantity, and purchaser information (purchaser's age, gender, region, etc.).

In addition, the data collection module 111 may collect purchase activity information of the purchaser who accesses the online shopping mall of each seller. Here, the purchase activity information may include purchaser identification information of the purchaser, information on the access time of the purchaser (including access start time and access end time), product search information in the online shopping mall, and information on whether or not the product was purchased in the online shopping mall.

The first analysis module 113 may generate a product sales-related report for each supplier by analyzing product sales information of each seller and purchase activity information of the purchaser who accessed the online shopping mall of each seller. The first analysis module 113 may transmit the product sales-related report to the corresponding supplier terminal 210.

Here, the product sales-related report may include first sales analysis information and second sales analysis information. The first sales analysis information may include a list of sellers up to a preset ranking based on a sales amount, statistical data of the purchaser who purchased the product of the corresponding supplier, and repurchase-related information on the purchaser who purchased the product of the supplier.

The second sales analysis information may include a sales volume ranking list within a category containing the product of the corresponding supplier, a similar product search list of the purchaser, a list of products purchased together by the purchaser, search term path information of the purchaser, and a lowest price and average price for each product. Here, the first sales analysis information and the second sales analysis information may not be separately classified but may be integrated into sales analysis information.

Specifically, the first analysis module 113 may rearrange product sales information of each seller for each supplier based on supplier information and product identification information. The first analysis module 113 may calculate the total sales amount for each supplier based on the product sales information of each seller. The first analysis module 113 can calculate the sales amount for each product of the supplier by multiplying a sales quantity of each product in the product sales information by a product sales price. The first analysis module 113 may calculate the total sales amount of the supplier by adding up the sales amount for each product of the supplier. The first analysis module 113 may calculate the sales amount for each seller selling the product of the supplier based on the sales amount for each product of the supplier. The first analysis module 113 sorts the sales amount for each seller selling the products of the suppliers in descending order and extracts a list of sellers up to the preset ranking.

In addition, the first analysis module 113 may generate statistical data of the purchaser who purchased the product of each supplier based on the product sales information. That is, since the product sales information includes supplier information and purchaser information (purchaser's age, gender, region, etc.) of the sold product, statistical data of the purchaser who purchased the product of each supplier may be generated. Here, the statistical data of the purchaser may include, but is not limited to, sales amount by age, sales amount by gender, and sales amount by region of the purchaser who purchased the product of the corresponding supplier.

In addition, the first analysis module 113 may generate repurchase-related information for the purchaser who purchased the product of each supplier based on the product sales information. Here, the repurchase-related information may include a repurchase rate for each purchaser and an average repurchase cycle for each purchaser. The first analysis module 113 may check whether or not the purchaser repurchased the product of the corresponding supplier based on the product sales information. The first analysis module 113 may calculate the repurchase rate for each purchaser based on a ratio of the total number of times of purchases and the number of times of repurchases of each purchaser for the product of the corresponding supplier. The first analysis module 113 may check the repurchase cycle whenever each purchaser makes a repurchase, and through this, calculate the average repurchase cycle for each purchaser.

In addition, the first analysis module 113 may generate a list of sales volume rankings within a category containing the product of the corresponding supplier based on the product sales information of each seller. Here, the sales volume may include one or more of the number of products sold and the sales amount of the product. The first analysis module 113 may check products in the category containing the product of the corresponding supplier. The first analysis module 113 may aggregate sales volume for all products within the category. The first analysis module 113 may generate the list of sales volume rankings by extracting a list of sales volumes of products within the category up to the preset ranking.

In addition, the first analysis module 113 may generate a list of similar products (similar product search list) searched together with the product of the supplier by the purchaser who purchased the corresponding product based on the product sales information of each seller and purchase activity information of the purchaser. The first analysis module 113 may check the date and time when the purchaser purchased the corresponding product through the purchaser information and sales date and time information among the product sales information. The first analysis module 113 may analyze the purchase activity information of the purchaser before and after the product purchase date and time of the purchaser and extract a list of similar products (similar product search list) searched by the purchaser together with the corresponding product.

In addition, the first analysis module 113 may generate a list of products purchased together with the product of the supplier by the purchaser who purchased the corresponding product based on the product sales information of each seller and purchase activity information of the purchaser. The first analysis module 113 may check the date and time when the purchaser purchased the product through the purchaser information and sales date and time information among the product sales information. The first analysis module 113 may analyze the purchase activity information of the purchaser before and after the product purchase date and time of the purchaser and extract a list of products (list of products purchased together) purchased by the purchaser together with the corresponding product.

In addition, the first analysis module 113 may generate search term path information that the purchaser who purchased the product of the supplier searched until the purchaser purchases the corresponding product, based on the product sales information of each seller and the purchase activity information of the purchaser. The first analysis module 113 may generate the search word path information by sequentially checking the search terms searched by the purchaser until the purchaser purchases the corresponding product. The search term path information may be a list of search terms searched by the purchaser in chronological order.

The first analysis module 113 can check the lowest price and average price for each product of the supplier within the platform. The first analysis module 113 may check a sales price for each product of the supplier in online shopping malls within the platform and calculate the lowest price (lowest selling price) and average price (average selling price) for each product of the supplier based on this.

The second analysis module 115 may provide additional information to improve the profit rate of the seller or supplier based on the product sales-related report generated by the first analysis module 113.

Specifically, the second analysis module 115 may check the sales amount list for each seller selling the product of the suppliers and extract one or more sellers below the preset ranking. The second analysis module 115 may recommend a content creator related to the product to the sellers whose sales amount are below the preset ranking (sellers with lower sales ranking).

Figure 3:
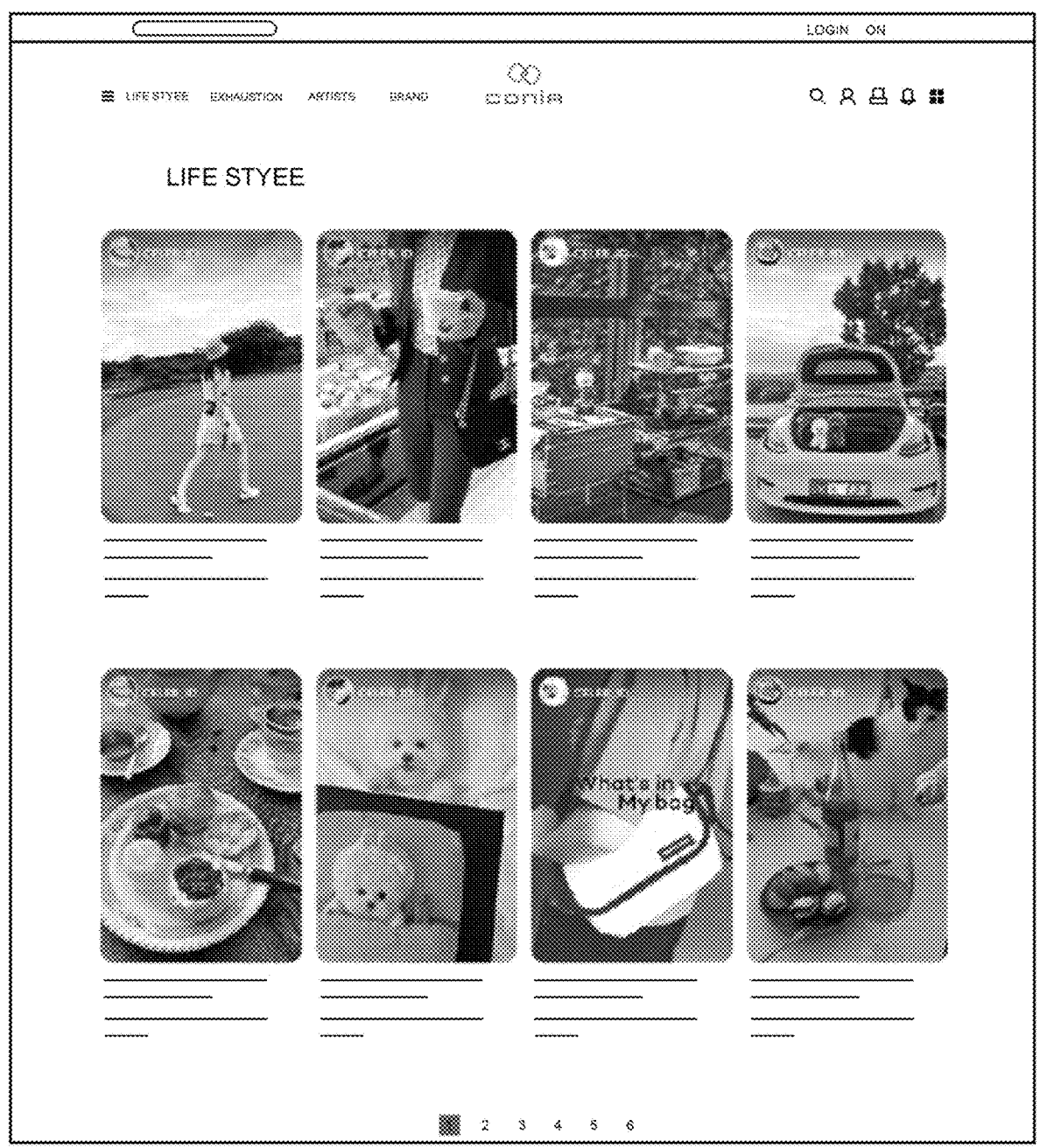
FIG. 3 is a diagram illustrating a state in which a content creator registers content on a platform in the e-commerce environment according to an embodiment of the disclosure.

That is, in the e-commerce environment 50, each content creator can register content on the platform. FIG. 3 is a diagram illustrating a state in which the content creator registers content on the platform in the e-commerce environment according to an embodiment of the disclosure.

Referring to FIG. 3, the content creators may register photos or video images containing certain products (e.g., golf equipment, food, dolls, bags, camping gear, etc.) on the platform. The content creators may upload content containing the product using social network services provided on the platform. For example, the content creator may photograph the product he or she purchases or use in his or her daily lives and upload the product to the platform, but is not limited thereto. The content creator may also upload content containing the product that receive sponsored advertising.

The content creators may also create content for promoting the product and upload the content to the platform. In this case, the content creators may be divided into a model (i.e., the influencer or the celebrity, etc.) of the content for promoting the product and an expert involved in creating content (e.g., a makeup expert, a stylist, a photographer, an editor, etc.). Hereinafter, the model may be referred to as a first content creator, and the expert in each field may be referred to as a second content creator.

Here, the second analysis module 115 may recommend the content creator who is expected to have high promotional effects can be expected by creating product promotional content to the sellers with lower sales ranking. In other words, it is possible to improve the sales of the sellers with lower sales ranking by recommending the content creator to create product promotional content for the product of the sellers with lower sales ranking A detailed description thereof will be made later with reference to FIG. 5.

In addition, the second analysis module 115 may generate notification information based on the sales list for each seller selling the product of the supplier and the lowest price information for each product of the supplier, and transmit the generated notification information to the corresponding supplier or seller.

In one embodiment, when the seller below the preset ranking (the seller with lower sales ranking) in the sales list for each seller registers the product of the supplier at the lowest price in the online shopping mall, the second analysis module 115 generates notification information for restricting the number of times of lowest-priced registrations and transmit the notification information to the seller terminal 220 of the corresponding seller. In this case, the second analysis module 115 may notify the supplier, who supplies the corresponding product, about the lowest-priced registration of the seller with lower sales ranking.

The second analysis module 115 may count the number of times of the lowest-priced registrations of the seller with lower sales ranking, and may assign a preset penalty to the corresponding seller when the number of times of lowest-priced registrations exceeds a preset threshold number of times. In this case, the second analysis module 115 may assign the preset penalty to the seller after approval from the supplier of the corresponding product. For example, the penalty may include, but is not limited to, the restriction on the registration of new product or the restriction on the use of additional services provided by the platform during a preset period.

In this specification, a module may mean a functional and structural combination of hardware for carrying out the technical idea of the present disclosure and software for driving the hardware. For example, the "module" may mean a logical unit of a predetermined code and hardware resources for executing the predetermined code, and does not necessarily mean a physically connected code or one type of hardware.

Figure 4:
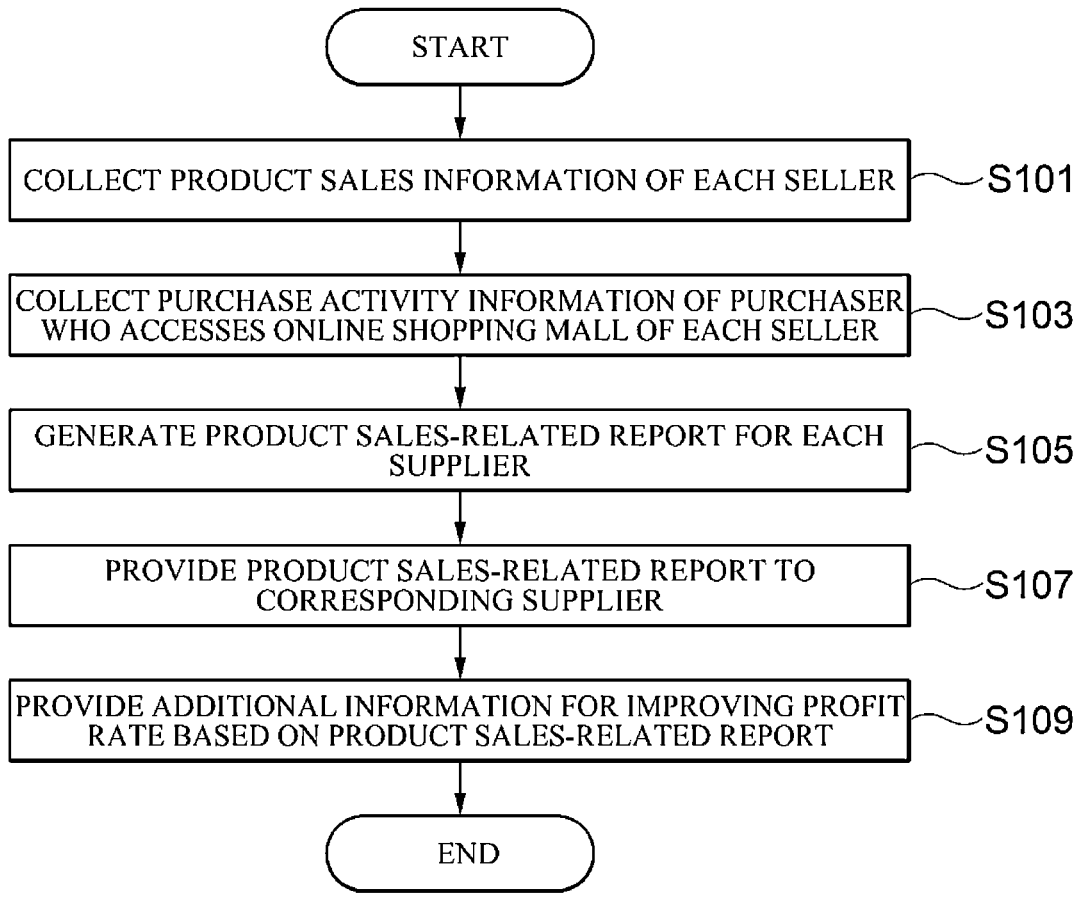
FIG. 4 is a flowchart illustrating a process of providing a product sales-related report to a supplier terminal by the platform server according to an embodiment of the present disclosure.

FIG. 4 is a flowchart illustrating a process of providing the product sales-related report to the supplier terminal 210 by the platform server 100 according to an embodiment of the present disclosure. In the illustrated flowchart, the method is described by being divided into a plurality of steps, but at least some of the steps may be performed in a different order, may be performed together in combination with other steps, omitted, may be performed by being divided into detailed steps, or may be performed by being added with one or more steps (not illustrated).

Referring to FIG. 4, the platform server 100 may collect product sales information of each seller registered on the platform (S 101). Here, the product sales information may include seller identification information of the seller who sold the product, product identification information of the sold product, supplier information of the sold product, sale date information (date and time, etc.), sales quantity, and purchaser information (purchaser's age, gender, region, etc.).

Next, the platform server 100 may collect purchase activity information of the purchaser who accesses the online shopping mall of each seller (S 103). Here, the purchase activity information may include information on the access time of the purchaser (including access start time and access end time), product search information in the online shopping mall, and information on whether or not the product was purchased in the online shopping mall.

Next, the platform server 100 may generate the product sales-related report for each supplier by analyzing product sales information of each seller and purchase activity information of the purchaser who accessed the online shopping mall of each seller (S 105).

Here, the product sales-related report may include first sales analysis information and second sales analysis information. The first sales analysis information may include a list of sellers up to the preset ranking based on a sales amount, statistical data of the purchaser who purchased the product of the corresponding supplier, and repurchase-related information on the purchaser who purchased the product of the supplier.

The second sales analysis information may include a sales volume ranking list within a category containing the product of the corresponding supplier, a similar product search list of the purchaser, a list of products purchased together by the purchaser, search term path information of the purchaser, and a lowest price and average price for each product.

Next, the platform server 100 may transmit the product sales-related report for each supplier to the corresponding supplier terminal 210 (S 107).

Next, the platform server 100 may provide additional information for improving the profit rate, based on the product sales-related report, to one or more of the supplier terminal 210 and the seller terminal 220 (S 109).

In one embodiment, the additional information may be recommendation information that recommends the content creator so as to promote the product that is selling poorly. The platform server 100 may transmit such recommendation information to the supplier terminal 210 or the seller terminal 220 related to the corresponding product.

Figure 5:
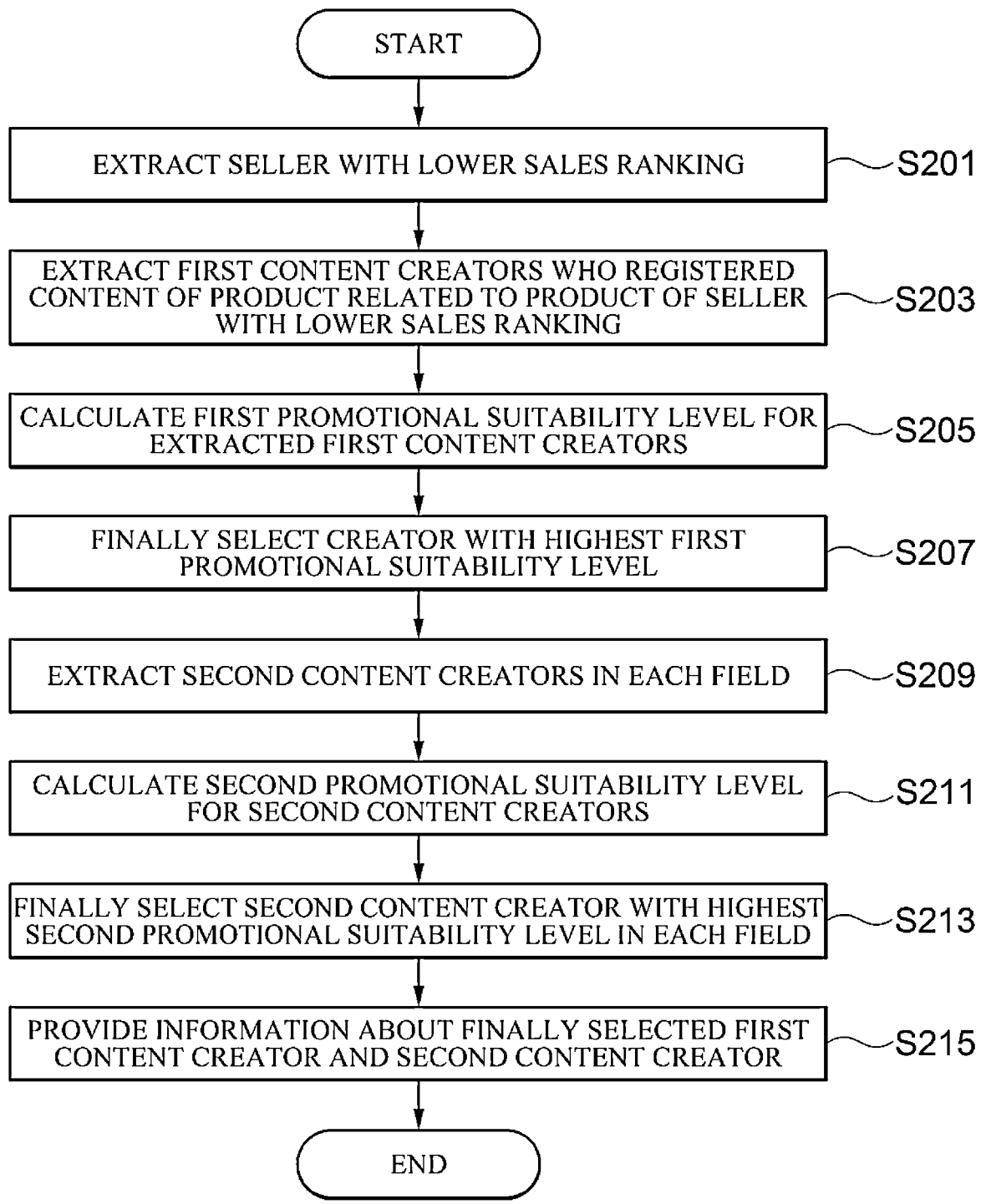
FIG. 5 is a flowchart illustrating a process of recommending a content creator to a seller with lower sales ranking by the platform server according to an embodiment of the present disclosure.

FIG. 5 is a flowchart illustrating a process of recommending the content creator to the seller with lower sales ranking by the platform server 100 according to an embodiment of the present disclosure. In the illustrated flowchart, the method is described by being divided into a plurality of steps, but at least some of the steps may be performed in a different order, may be performed together in combination with other steps, omitted, may be performed by being divided into detailed steps, or may be performed by being added with one or more steps (not illustrated).

Referring to FIG. 5, the platform server 100 may check the sales amount list for each seller selling the product of the supplier and extract one or more sellers below the preset ranking (the sellers with lower sales ranking) (S 201).

Next, the platform server 100 may extract first content creators (i.e., models, such as an influencers or celebrities) who registered content of products related to the product of the seller with lower sales ranking from among contents previously registered on the platform (S 203).

In one embodiment, the platform server 100 may calculate the similarity between the products included in the contents already registered on the platform and the products of the seller with lower sales ranking. If the calculated similarity is more than a preset threshold value, the platform server 100 may determine that the product included in the corresponding content is related to the product of the seller with lower sales ranking, and extract the first content creator who registered the content.

Next, the platform server 100 may calculate a first promotional suitability level for the product of the seller with lower sales ranking for each of the extracted first content creators (S 205). The platform server 100 may calculate the first promotional suitability level for each of the first content creators based on one or more preset suitability level determination factors.

Here, the suitability level determination factors may include 1) the number of times or frequency of uploads of content related to the corresponding product (product of the seller with lower sales ranking), 2) a degree of social feedback of content related to the corresponding product, 3) a degree of influence of the first content creator, and 4) forecasted sales related to the product of the first content creator.

The platform server 100 may assign a first-first suitability level score to each of the first content creators according to the number of times or frequency of uploads of content related to the corresponding product. The platform server 100 may assign a first-second suitability level score to each of the first content creators according to the degree of social feedback of the content related to the corresponding product. The platform server 100 may assign a first-third suitability level suitability level score according to the degree of influence of the first content creator. In this case, the influence of the first content creator may be determined in consideration of the number of followers of the first content creator, the total number of uploaded content, the total number of social feedback on the uploaded content, etc. The platform server 100 may assign a first-fourth suitability level score according to the forecasted sales related to the corresponding product of the first content creator. Here, the forecasted sales related to the corresponding product of the first content creator can be calculated based on the average sales of products included in the contents already registered by the first content creator.

The platform server 100 may calculate the first promotional suitability level for the corresponding product by adding up the first-first suitability level score, the first-second suitability level score, the first-third suitability level score, and the first-fourth suitability level score of each first content creator. In this case, the platform server 100 may calculate the first promotional suitability level for the corresponding product of the first content creator by assigning weights to the first-first suitability level score, the first-second suitability level score, the first-third suitability level score, and the first-fourth suitability level score, respectively, and then summing the first-first to first-fourth suitability level scores. The sum of the respective weights may be 1.

Next, the platform server 100 may finally select the first content creator with the highest first promotional suitability level for the corresponding product among the first content creators as the first content creator suitable for promoting the corresponding product (S 207).

Next, the platform server 100 may extract second content creators in each field who have collaborated with the finally selected first content creator (S 209).

That is, the platform server 100 may select second content creators to create content (promotional content) for promoting the corresponding product from among experts who created content in collaboration with the finally selected first content creator. In this case, the platform server 100 may extract the second content creators in each field (e.g., the makeup expert, the stylist, the photographer, the editor, etc.) who have collaborated with the finally selected first content creator.

Next, the platform server 100 may calculate a second promotional suitability level for the product of the seller with lower sales ranking for each of the extracted second content creators in each field (S 211). In this case, the platform server 100 may calculate the second promotional suitability level of each of the second content creators in each field based on one or more preset suitability level determination factors.

Here, the suitability level determination factors may include 1) the number of times of collaborations with the finally selected first content creator, 2) a collaboration satisfaction level with the finally selected first content creator, and 3) the number of times of content creations related to the corresponding product.

The platform server 100 may assign a second-first suitability level score to each of the second content creators in each field according to the number of times of collaborations with the finally selected first content creator. The platform server 100 may assign a second-second suitability level score to each of the second content creators in each field according to the collaboration satisfaction level of the finally selected first content creator. The platform server 100 may assign a second-third suitability level score to each of the second content creators in each field according to the number of times of content creations related to the corresponding product.

The platform server 100 may calculate the second promotional suitability level by adding up the second-first suitability level score, the second-second suitability level score, and the second-third suitability level score of each of the second content creators in each field. In this case, the platform server 100 may assign weights to the second-first suitability level score, the second-second suitability level score, and the second-third suitability level score, and then adds the second-first to second-third suitability level scores to calculate the second promotional suitability level for each of the second content creators in each field. The sum of the respective weights may be 1.

Next, the platform server 100 may finally select the second content creator with the highest second promotional suitability level among the second content creators in each field as the second content creator suitable for promoting the product (S 213).

Next, the platform server 100 may provide information about the finally selected first content creator and second content creator as additional information to the seller terminal 220 of the seller with lower sales ranking (S 215).

However, the present disclosure is not limited thereto, and information about the first content creator and the second content creator may be provided to the corresponding provider terminal 210.

According to the embodiments of the present disclosure, by recommending content creators suitable for promoting the product to the seller with lower sales ranking, it will be possible to help the seller with lower sales ranking on the platform to increase the profit rate by increasing the sales volume of the corresponding product.

Figure 6:
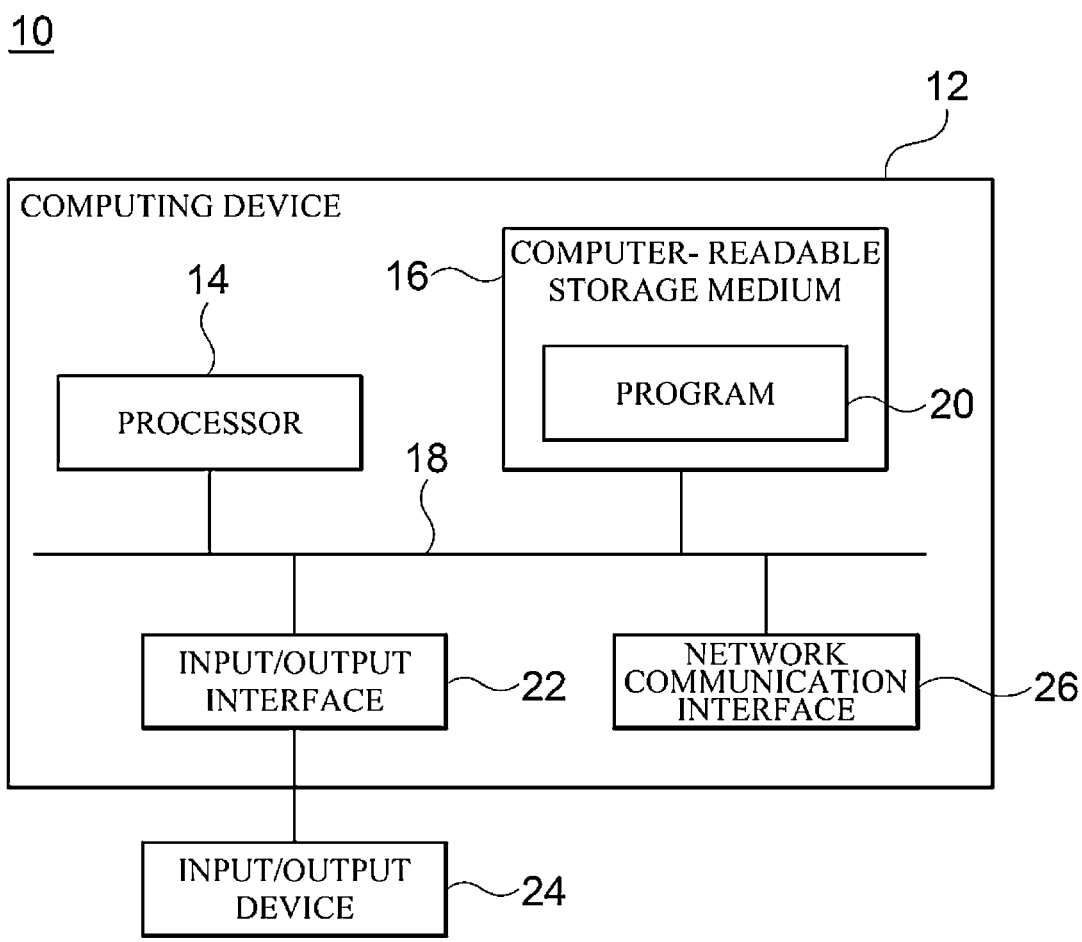
FIG. 6 is a block diagram for illustratively describing a computing environment including a computing device suitable for use in exemplary embodiments.

FIG. 6 is a block diagram for illustratively describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In one embodiment, the computing device 12 may be the platform server 100. Additionally, computing device 12 may be the supplier terminal 210. Additionally, the computing device 12 may be the seller terminal 220. Additionally, the computing device 12 may be the content creator terminal 230. Additionally, the computing device 12 may be the purchaser terminal 240.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

According to embodiments of the present disclosure, by generating and providing the product sales-related report for each supplier, each supplier can easily grasp a sales status of each seller for the product that the supplier supplies. In addition, by recommending content creators suitable for promoting the corresponding product to the seller with lower sales ranking, it will be possible to help the seller with lower sales ranking on the platform to increase the profit rate by increasing the sales volume of the corresponding product.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A method for providing information based on e-commerce performed on a computing device including one or more processors and a memory that stores one or more programs executed by the one or more processors, the method comprising:

collecting product sales information of each seller registered on a platform;

collecting purchase activity information of a purchaser who accesses an online shopping mall of each seller;

generating a product sales-related report for each supplier supplying a product to the platform based on the product sales information and the purchase activity information;

providing the product sales-related report to a corresponding supplier terminal;

generating notification information based on a sales amount list for each seller selling the product of the supplier and lowest price information for each product of the supplier, the generating of the notification information including:

extracting a seller with lower sales ranking based on the sales amount list for each seller; and when the seller with lower sales ranking registers the product of the supplier in an online shopping mall at the lowest price, generating notification information for restricting the number of times of lowest-priced registrations;

providing the notification information to one or more of the supplier and a corresponding seller; and counting the number of times of lowest-priced registrations of the seller with lower sales ranking and assigning a preset penalty to the corresponding seller when the number of times of lowest-priced registrations exceeds a preset threshold number of times.

2. The method of claim 1, wherein the product sales information includes:

one or more of seller identification information of the seller who sold the product, product identification information of the sold product, supplier information of the product, sales date and time information, sales quantity, and purchaser information; and the purchase activity information includes:

one or more of purchaser identification information of the purchaser, information on an access time of the purchaser, product search information in the online shopping mall, and information on whether or not the product was purchased in the online shopping mall.

3. The method of claim 2, wherein the product sales-related report includes:
a list of sellers up to a preset rank based on a sales amount for each seller selling the product of the supplier, statistical data of the purchaser who purchased the product of the supplier, repurchase-related information of the purchaser who purchased the product of the supplier, a sales volume ranking list within a category containing the product of the supplier, a similar product search list of the purchaser who purchased the product of the supplier, a list of products purchased together by the purchaser who purchased the product of the supplier, search term path information of the purchaser who purchased the product of the supplier, and one or more of a lowest price and an average price for each product of the supplier.

4. The method of claim 2, further comprising:
providing additional information for improving a profit rate to one or more of the supplier and the seller based on the product sales-related report.

5. The method of claim 4, wherein the providing of the additional information includes:
extracting the seller with lower sales ranking from among sellers selling the product of the supplier; and
recommending a content creator related to the product to one or more of the seller with lower sales ranking and the supplier.

6. The method of claim 5, wherein the recommending of the content creator includes:
extracting first content creators who have registered product content related to the product of the seller with lower sales ranking from among the content registered on the platform;
calculating a first promotional suitability level for the product for each of the extracted first content creators; and
finally selecting a first content creator for promotion of the product from among the extracted first content creators according to the calculated first promotional suitability level.

7. The method of claim 6, wherein, in the calculating of the first promotional suitability level, based on suitability level determination factors including one or more of the number of times or frequency of uploads of content related to the product, a degree of social feedback of content related to the product, a degree of influence of the extracted first content creator, and forecasted sales related to the product of the extracted first content creator, the first promotional suitability level is calculated for each of the extracted first content creators.

8. The method of claim 6, wherein the recommending the content creator further includes:
extracting second content creators in each field who have collaborated with the finally selected first content creator;
calculating a second promotional suitability level for the product for each of the extracted second content creators; and
finally selecting a second content creator in each field from among the extracted second content creators according to the calculated second promotional suitability level.

9. The method of claim 8, wherein, in the calculating of the second promotional suitability level, based on suitability level determination factors including one or more of the number of times of collaborations with the finally selected first content creator, a collaboration satisfaction level of the finally selected first content creator, and the number of times of content creations related to the product, the second promotional suitability level may be calculated for each of the extracted second content creators.

10. The method of claim 9, wherein the recommending of the content creator includes providing information on the finally selected first content creator and the finally selected second content creator in each field to one or more of the seller with lower sales ranking and the supplier.

11. The method of claim 2, wherein the generating of the product sales-related report includes:
generating a list of sellers up to a preset rank based on a sales amount for each seller selling the product of the supplier based on the product sales information and the purchase activity information;
generating statistical data of the purchaser who purchased the product of the supplier based on the product sales information and the purchase activity information;
generating repurchase-related information of the purchaser who purchased the product of the supplier based on the product sales information and the purchase activity information;
generating a sales volume ranking list within a category containing the product of the supplier based on the product sales information and the purchase activity information;
generating a similar product search list of the purchaser who purchased the product of the supplier based on the product sales information and the purchase activity information;
generating a list of products purchased together by the purchaser who purchased the product of the supplier based on the product sales information and the purchase activity information;
generating search term path information of the purchaser who purchased the product of the supplier based on the product sales information and the purchase activity information; and
checking one or more of a lowest price and an average price for each product of the supplier based on the product sales information and the purchase activity information.

12. A computing device comprising:
one or more processors;
a memory; and
one or more programs stored in the memory and configured to be executed by the one or more processors, the one or more programs including:
an instruction for collecting product sales information of each seller registered on a platform;
an instruction for collecting purchase activity information of a purchaser who accesses an online shopping mall of each seller;
an instruction for generating a product sales-related report for each supplier supplying a product to the platform based on the product sales information and the purchase activity information;
an instruction for providing the product sales-related report to a corresponding supplier terminal;
an instruction for generating notification information based on a sales amount list for each seller selling the product of the supplier and lowest price information for each product of the supplier, the instruction for generating of the notification information including:
  an instruction for extracting a seller with lower sales ranking based on the sales amount list for each seller; and
  when the seller with lower sales ranking registers the product of the supplier in the online shopping mall at the lowest price, an instruction for generating notification information for restricting the number of times of lowest-priced registrations;
  an instruction for providing the notification information to one or more of the supplier and a corresponding seller; and
  an instruction for counting the number of times of lowest-priced registrations of the seller with lower sales ranking and assigning a preset penalty to the corresponding seller when the lowest-priced registration number exceeds a preset threshold number of times.

13. A computer program stored in a non-transitory computer readable storage medium, the computer program including one or more instructions that, when executed by a computing device including one or more processors, cause the computing device to perform:
  collecting product sales information of each seller registered on a platform;
  collecting purchase activity information of a purchaser who accesses an online shopping mall of each seller;
  generating a product sales-related report for each supplier supplying a product to the platform based on the product sales information and the purchase activity information;
  providing the product sales-related report to a corresponding supplier terminal;
  generating notification information based on a sales amount list for each seller selling the product of the supplier and lowest price information for each product of the supplier, the generating of the notification information including:
    extracting a seller with lower sales ranking based on the sales amount list for each seller, and
    when the seller with lower sales ranking registers the product of the supplier in an online shopping mall at the lowest price, generating notification information for restricting the number of times of lowest-priced registrations;
  providing the notification information to one or more of the supplier and a corresponding seller; and
  counting the number of times of lowest-priced registrations of the seller with lower sales ranking and assigning a preset penalty to the corresponding seller when the number of times of lowest-priced registrations exceeds a preset threshold number of times.

* * * * *